July 19, 1960   W. L. McCLURE   2,945,724
DISENGAGING GRANULAR SOLIDS FROM LIFTING GAS
Filed March 6, 1958
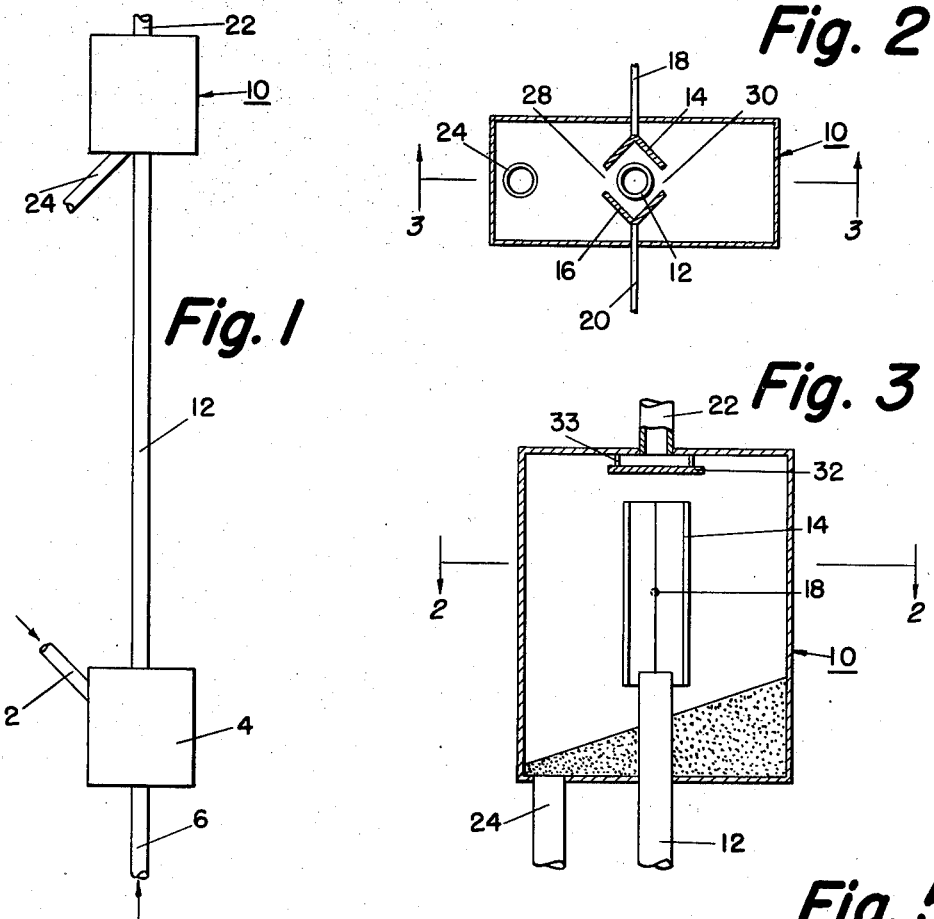
INVENTOR.
WILLIAM L. MC CLURE
BY Robert O. Spindle
ATTORNEY United States Patent Office 2,945,724
Patented July 19, 1960

2,945,724

DISENGAGING GRANULAR SOLIDS FROM LIFTING GAS

William L. McClure, Toledo, Ohio, assignor to Sun Oil Company, Philadelphia, Pa., a corporation of New Jersey Filed Mar. 6, 1958, Ser. No. 719,525

4 Claims. (Cl. 302—59)

This invention relates to pneumatic elevation systems for particle form granular solids, and more particularly to process and apparatus for separating granular solids from lifting gas at the completion of the elevation operation.

It is known in the art to suspend particle form granular solids, having average particle size for example within the approximate range from 4 to 20 mesh, in a lifting fluid, for example, air, steam, flue gas, etc. and pass the resulting suspension upwardly through a confined lift conduit into an expanded zone known as a disengager. For example, in catalytic cracking of petroleum, granular solid cracking catalyst is gravitated as a compact bed through a downflow path, comprising a reaction vessel wherein the solids are contacted under cracking conditions with heavy petroleum hydrocarbons and a regeneration vessel in which the solids are contacted with oxygen under combustion conditions to burn off carbon deposited during the cracking stage. It is known to suspend the solids, after passage through the downflow path, in a lifting fluid, elevate them to a suitably high level, and pass them again by gravity through the downflow path.

In such pneumatic elevation systems, it is sometimes desired to increase the rate of passage of granular solids through the lift conduit. This may be desired for example in order to increase the rate at which heat available in the catalyst after the regeneration operation is introduced into the reaction zone. When the rate of flow of solids through the lifting zone is increased, this generally results in the catalyst rising to a higher level in the disengager prior to falling back down therein. The striking of the top of the disengager by the catalyst should be avoided in order to minimize the attrition undergone by the solids during the disengaging operation. This makes it desirable to be able to provide means to counteract the tendency for increased height of rise in the disengager resulting from the increased throughput of catalyst. The process and apparatus according to the present invention provides a novel manner of obtaining this and other beneficial results.

The invention will be more fully described with reference to the attached drawing. Figure 1 illustrates generally a pneumatic lifting system comprising engager, lift conduit and disengager. Figures 2 and 3 are sectional plan and elevation views respectively of a disengager for separation of solids from gas at the completion of the lifting operation. Figures 4 and 5 illustrate in sectional plan view modifications of the apparatus shown in Figure 2.

Referring to Figures 2 and 3, disengager 10 receives the upper end of the lift conduit 12 and has within it channel members 14 and 16 which in this embodiment are similar in shape to angle irons. These members are situated above the upper end of the lift conduit and outside the cylindrical space occupied by the imaginary upward projection of the lift conduit within the disengager. Secured to the members 14 and 16 are rods 18 and 20 respectively, which pass through the side walls of disengager 10 and are adapted to be moved horizontally, thus moving the members 14 and 16 toward or away from the cylindrical space above the lift conduit.

In operation, granular solids such as silica-alumina cracking catalyst having average particle size for example of about 6 to 8 mesh (United States Sieve Series), are passed downwardly in a compact stream through conduit 2 into engager vessel 4. Lifting gas, for example flue gas or air, is introduced through line 6 into vessel 4 and contacts therein the solids introduced through line 2. The lifting gas carries the solids in suspension from vessel 4 into lift conduit 12. Any suitable construction can be employed in the engager vessel 4, this being a conventional feature of prior pneumatic elevation systems.

The lifting gas carrying suspended granular solids passes out of the upper end of lift conduit 12 and into the space between the channel members 14 and 16. It is preferred but not essential that the lower ends of members 14 and 16 be beneath the top of lift conduit 12. The solids and gas pass laterally through the spaces 28 and 30 between the outer portions of the members 14 and 16. The construction of the apparatus and the operating conditions are such that substantially all of the solids pass either through the spaces 28 and 30 beneath the upper ends of the members 14 and 16 or through the space between the lower ends of those members and the lift conduit 12. The solids fall downwardly in the disengager onto a compact bed in the bottom thereof and are removed through line 24 for example into a surge hopper above a catalytic cracking reactor not shown. The solids then pass through the reactor and a regenerator, also not shown, and are removed from the lower end of the latter through line 2 into the engager 4 again. The lifting gas from which solids have been separated passes around baffle 32 secured by rods 33, and leaves disengager 10 through line 22.

When it is desired to increase the rate of passage of solids upwardly through conduit 12, the channel members 14 and 16 are moved toward each other by means of the rods 18 and 20. It has been found that this results in a decrease in the height of rise of solids in the disengager when the conditions are otherwise the same. When the throughput of solids is increased, so that the tendency is for the solids to rise higher in the disengager, the moving of the channel members counteracts this tendency and permits the operation to be continued with the desired height of rise, for example the same height of rise as before. The solids continue to pass through the spaces 28 and 30 beneath the upper ends of the members 14 and 16.

When, on the other hand, it is desired for any reason to reduce the rate of passage of solids through conduit 12, the channel members 14 and 16 can if desired be moved apart. This may be desired in order to avoid excessive reduction of the height of rise, or to avoid the stalling of the lift which might otherwise occur.

The particular shape of the members 14 and 16 as illustrated in Figures 2 and 3 can be varied as desired. Certain illustrative modifications of the members are illustrated in Figures 4 and 5. It will be apparent to a person skilled in the art that many other modifications will give suitable results. Essential characteristics of the members are that they are vertically elongated, and have opposing surfaces which provide a channel through which the solids pass, and have lateral spaces therebetween through which the solids can pass without rising above the top of the channel members.

In Figure 4, the members 14a and 16a are illustrated as being half cylinders. Any other suitable arcuate cross section can be employed. In Figure 5, four plates 14b, 14c, 16b and 16c are employed, actuated by rods 18b, 18c, 20b and 20c. There are four lateral spaces 28a, 28b, 30a and 30b through which solids may pass. It is readily apparent that any desired number of channel members can be employed, and that they may have any suitable shape.

The ratio of height to major cross-sectional dimension of the channel provided by the channel members depends on various factors including the desired range of variation in the height of rise. Usually the ratio will be within the approximate range from 2 to 50, though other ratios can be employed in some instances.

In all of the constructions illustrated above, the principle of operation is essentially the same. Moving the channel members toward each other results in a decrease in the height of rise of solids in the disengager under otherwise similar conditions, while moving the channel members apart has the opposite effect.

It will usually be undesirable to move the channel members so close together that they meet, thereby eliminating the lateral spaces 28, 30, etc. In many instances, this would result in all of the solids reversing direction within the channel provided by the members, so that all of the solids would pass downwardly through the lower end of that channel. This would result in a high degree of attrition as a result of collisions between downwardly moving particles and upwardly moving particles in the vicinity of the lower end of the channel. By providing the lateral spaces 28 and 30, etc., the solids are enabled to pass laterally, out of the path of the rising solids, to a sufficient extent to avoid excessive attrition. The necessary width of the spaces 28 and 30, etc. can be quite small and will depend on various other conditions involved in the operation. In the light of the present specification, a person skilled in the art can provide a spacing which will give satisfactory results.

The greatest extent to which the channel members can be moved apart and still have a substantial effect on the height of rise of solids also varies according to the details of construction and operation. In some instances at least, the spacing may be increased by several lift conduit diameter without eliminating the effect. Here again, a person skilled in the art can, in the light of the specification, provide a suitable spacing.

The dimensions of the channel members and of the spaces between them and the lift conduit outlet vary depending on the characteristics of the lifting operation. The dimensions given in the following example are illustrative, but other dimensions, readily determined by a person skilled in the art, can be employed.

The following example illustrates the invention:

A lift conduit 4 feet high and having diameter of 2 inches is employed. The upper end of the disengager is about 15 feet above the upper end of the lift conduit. Two angle irons are employed, each having the shape of two plates 2 inches wide and 8 feet long joined at right angles as shown in the member 14 of Figure 2 for example. The lower ends of the angle irons are positioned about an inch below the upper end of the lift conduit.

Granular solid cracking catalyst having average particle size of 6 mesh is conveyed through the lift conduit at a rate of about 4000 pounds per hour. The lifting fluid is flue gas supplied at a rate of about 160 standard cubic feet per minute. At this rate, without the angle irons, a height of rise of about 15 feet is obtained. With the angle irons in place, and spaced so that there is an opening between them on either side, 8 feet long and about ½ inch in width, a height of rise of about one foot is obtained. As the angle irons are moved apart, the height of rise increases. When they are so far apart that they do not appreciably affect the solids path, the height of rise is again about 15 feet.

When the angle irons are sufficiently close to affect the solids path, a relatively dense mass of solids exists at the top of the fountain of solids issuing from the lift. As the angle irons are moved toward each other, the amount of solids in the dense mass increases concurrently with the decrease in height of rise.

Similar results are obtained in systems wherein solids are elevated through greater heights, e.g. in the neighborhood of 200 to 300 feet. Although the dimensions of equipment are greater than in the smaller unit, the effects of moving the channels in the disengager are generally the same. Typically, in a commercial unit, the lift conduit diameter is 8 inches, and the dimensions of the plates forming the angle irons 8 inches by 14 feet. Typical lifting gas and catalyst rates are 650 standard cubic feet per minute and 32 tons per hour respectively.

The invention claimed is:

1. Apparatus for disengaging granular solids from lifting fluid which comprises a lift conduit adapted to discharge solids upwardly into an enclosed disengaging vessel, a first vertically extending baffle within said vessel and outside the space occupied by the imaginary upward projection of the lift conduit within said vessel, a second vertically extending baffle within said vessel and facing the first baffle, the second baffle also being situated outside said space, said baffles comprising a baffle assembly which in horizontal cross section subtends a major portion, but less than all, of the circumference of said upward projection, and providing between said baffles a vertically extending aperture for egress of solids from the space between the baffles, and means for moving the first and second baffles horizontally within said vessel thereby to change the horizontal distance between them, and thereby to change the area of said aperture and change the height of rise of solids in said space at otherwise constant conditions.

2. Process for disengaging granular solids from lifting gas which comprises discharging lifting fluid containing granular solids suspended therein from a confined lifting zone into an enlarged disengaging zone, passing the solids and gas therein between baffle surfaces at a velocity sufficiently low that substantially all the solids pass laterally between the opposed surfaces below their upper ends, and moving the surfaces in a horizontal direction inwardly when it is desired to increase the rate of passage of solids upwardly through the lift conduit and moving the surfaces in a horizontal direction outwardly when it is desired to decrease the rate of passage of solids upwardly through the lift conduit.

3. Apparatus according to claim 1 wherein said baffle assembly defines the sides of a square having openings at a plurality of corners thereof.

4. Apparatus according to claim 1 wherein said baffle assembly is arcuate with apertures 180° apart.

References Cited in the file of this patent

UNITED STATES PATENTS

| 167,602 | Brinkerhoff | Sept. 14, 1875 |
| 2,244,372 | Pomeroy | June 3, 1941 |
| 2,674,499 | Thayer | Apr. 6, 1954 |
| 2,694,605 | Berg | Nov. 16, 1954 |
| 2,695,197 | Burtis | Nov. 23, 1954 |
| 2,717,181 | Snow | Sept. 6, 1955 |
| 2,796,947 | Berg | June 25, 1957 |

FOREIGN PATENTS

| 16,416 | Great Britain | July 17, 1907 |
| 326,546 | Great Britain | Mar. 17, 1930 |
| 275,212 | Italy | June 14, 1930 |